United States Patent [19]
Picquendar et al.

[11] 4,103,110
[45] Jul. 25, 1978

[54] TELEPHONE TRANSMISSION SYSTEM COMPRISING DIGITALLY PROCESSING FREQUENCY MULTIPLEXOR AND DEMULTIPLEXOR

[75] Inventors: Jean-Edgar Picquendar; Boris Sokoloff, both of Paris, France

[73] Assignee: Thomson-CSF, Paris, France

[21] Appl. No.: 727,540

[22] Filed: Sep. 28, 1976

[30] Foreign Application Priority Data

Oct. 2, 1975 [FR] France .................. 75 30234

[51] Int. Cl.² ............................................. H04J 1/18
[52] U.S. Cl. .............................. 179/15 FD; 364/724
[58] Field of Search ................... 179/15 FD, 15 FS; 235/152; 325/42; 364/724, 726

[56] References Cited

U.S. PATENT DOCUMENTS

| 3,605,019 | 9/1971 | Cutter | 179/15 FD |
| 3,891,803 | 6/1975 | Daguet | 179/15 FS |
| 3,971,922 | 7/1976 | Bellanger | 179/15 FS |

Primary Examiner—Kathleen Claffy
Assistant Examiner—Joseph A. Popek
Attorney, Agent, or Firm—Cushman, Darby & Cushman

[57] ABSTRACT

The invention relates to telephone transmission systems in which frequency multiplexing is carried out by digital processes. It consists in substituting to a computation step of an analytical signal a computation step of a much simpler complex signal. The ultimate signal obtained is not compatible with standard multiplexing apparatus, but may nevertheless be transmitted along ordinary channels.

12 Claims, 9 Drawing Figures

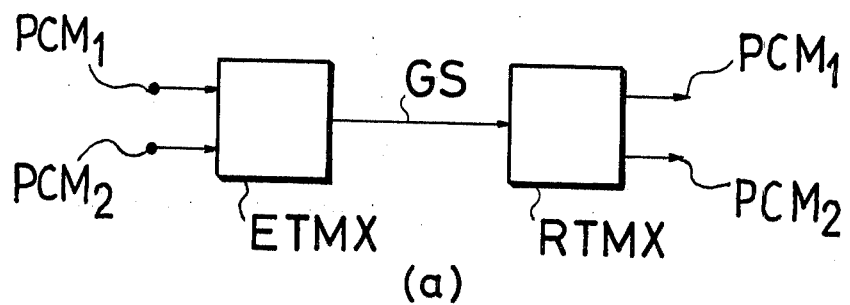
(a)
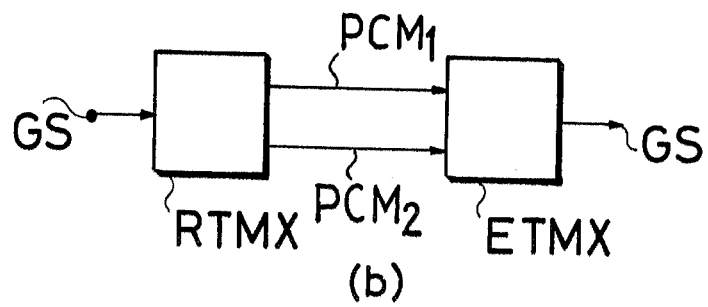
(b)
Fig. 8

TELEPHONE TRANSMISSION SYSTEM COMPRISING DIGITALLY PROCESSING FREQUENCY MULTIPLEXOR AND DEMULTIPLEXOR

This invention relates to telephone transmission systems in which several multiplexed telephone channels are transmitted along one and the same line. The invention also relates to the multiplexers and demultiplexers which enable a system of this kind to be used in practice.

For transmitting several separate telephone channels along one and the same line, it is known that these channels may be frequency-converted, for example by single sideband modulation of a set of suitably staggered carriers by these channels. International standards define the various frequency conversion levels used in these frequency multiplexes and one of them is, for example, the Secondary European Group which comprises 60 telephone channels of which the spectrum is inverted and which are staggered at intervals of 4 kHz between 312 and 552 kHz.

It is also known that these channels can be digitalised and that the binary words thus obtained can be multiplexed in time to obtain a succession of frames which are transmitted along a common line, thus forming a time-division multiplex. These operations are also defined by international standards which, in particular, define the European PCM Group which comprises 30 channels each digitalised with 8 bits at intervals of 125 $\mu$s (i.e. at a frequency of 8000 Hz). These channels are multiplexed in a frame of 256 bits, the 16 additional bits corresponding to 2 zero channels and being reserved for synchronisation.

In the case of frequency multiplexing, the various operations of modulation, demodulation and filtration may be carried out by digital methods applied to the telephone signals which are previously digitalised and then reconverted into analog form. A method such as this is described in the article "SSB/FDM Utilizing TDM Digital Filters" published by Carl F. KURTH in the journal "IEEE Transactions On Communication Technology," Vol. com-19, No. 1, February 1971.

In order to improve the simplicity and performance of a system of the type in question, it is preferred, rather than copying the digital method from the analog method, to use a more synthetic method such as that described by Jacques DAGUET and Maurice BELLANGER in French Patent No. 72.21.646, in the article "TDM-FDM Transmultiplexer: Digital Polyphase and FFT" published in the journal "IEEE Transactions on Communications," Vol. com-22, No. 9, September 1974, and in the article entitled "Maquette de faisabilité d'un Transmultiplexeur Numérique" (Feasibility Model of a Digital Transmultiplexer) published in the journal "Cables et Transmissions" No. 4, October 1974.

In the multiplexer described in these publications, the telephone signals, which are real signals, are applied to modulators which convert them into analytical signals comprising a component in phase and a component in quadrature. These analytical signals are applied to a fast Fourier transform calculator acting as modulator. The signals issuing in parallel from this calculator pass through circuits acting as filters which enable the cross-talk between channels to be eliminated and are then applied in series to a digital-analog converter. It can be shown that the signal issuing from this converter comprises at least one frequency multiplex of the telephone channels whose spectrum is based on the zero frequency. In order to obtain the desired secondary group, it is sufficient to effect a frequency conversion, for example by subjecting an adequate carrier to lower single sideband modulation.

It is often necessary to convert time-division multiplexes into frequency multiplexes and vice versa, for example two 30-channel PCM groups into one 60 channel secondary group, in particular for utilising existing trunk connections which are only able to transmit analog signals. An apparatus which effects a conversion such as this is called a transmitting or receiving transmultiplexer, according to the circumstances.

If an apparatus such as this is to deliver or use a signal identical with that of a secondary group, it is necessary to eliminate the amplitude compression effects used in PCM systems. This can only be done without difficulty by decoding the PCM signal into an analog signal. In this case, the analog signal obtained has to be linearly recoded in order to be able to use a digital multiplexer.

An object of the present invention is to simplify the multiplexers to a considerable extent by accepting obtaining a signal which is not identical with that of a secondary group. In this case, it is possible in particular directly to use the digital PCM signals in the digital multiplexer. This simplification is of particular interest in cases where two 30-channels PCM groups are converted into one 60 channel secondary group because a single apparatus receives a whole number of PCM and secondary groups.

Although the signal is not identical with that of a secondary group, it does have the same external characteristics and is comprised within the same frequency limits, which means that it is still possible to use existing analog connections without modification. The only limitation arises out of the need to use homologous equipment at each end.

If this limitation is accepted, the non-compatibility between the signals may be much further increased whilst remaining within the same frequency limits. To this end, complex signals obtained by simple calculation, rather than analytical signals, are formed in the apparatus according to the invention from real telephone signals and the anti-crosstalk filtration function is eliminated after modulation which introduces into the spectrum an interchannel crosstalk which is eliminated at the receiving end by the action of the receiver homologous with the transmitter. The spectral distribution is thus entirely different from that of a normal secondary group.

In accordance with the present invention, it is provided an apparatus for multiplexing a set of $n$ incoming telephone channels into an output frequency multiplex channel, said apparatus comprising:

means for providing from said incoming channels every T $\mu$s respectively $n$ digital signals $f_{t,k}$;

means for computing every 2 T $\mu$s from said signals $f_{t,k}$ $n$ compound signals $$S_{t,m} = \tfrac{1}{2}[(f_{t,k} + f_{t+T,k}) + j(f_{t,k} - f_{t+T,k})]$$

and $n$ compound signals $$S_{t,m}^* = \tfrac{1}{2}[(f_{t,k} + f_{t+T,k}) - j(f_{t,k} - f_{t+T,k})]$$

means for computing every 2 T μs the Fourier Transform of order 2 N × 2 N (N > n) of said signals $S_{t,m}$ and $S_{t,m}{}^x$, delivering 2 N real signals in parallel;

means for serializing according to a given order and during an interval of 2 T μs said real signals, delivering a serial digital signal; and means for converting said serial digital signal into an output analogical signal, feeding said frequency multiplex channel.

For a better understanding of the invention and to show how the same may be carried into effect, reference will be made to the ensuing description and to the attached figures among which:

FIGS. 8a and 8b illustrate flow diagrams of transmission systems.

Figure 1:
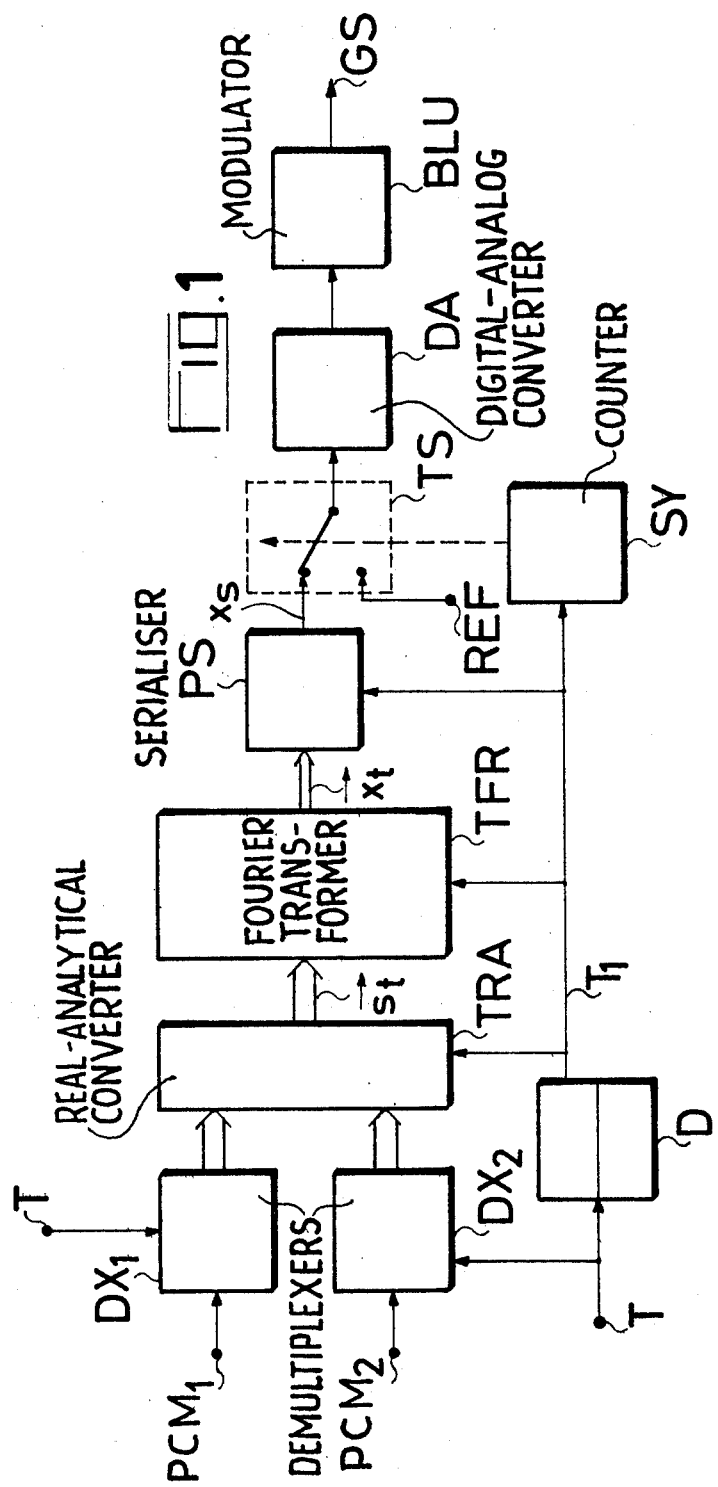
FIG. 1 illustrates a transmitting transmultiplexer.

The transmitting transmultiplexer illustrated diagrammatically in FIG. 1 comprises two demultiplexers $DX_1$ and $DX_2$, a real-analytical converter TRA, a Fourier transformer TFR, a serialiser PS, a counter SY, a bistable circuit D, a commutator TS, a digital-analog converter DA and a modulator BLU.

The symbols used are used by way of example and are consistent with european telephone standards. The single arrows represent connections in which signals or channels circulate in series. The thick arrows represent connections in which channels circulate in parallel. The connections supporting service signals, and in particular clock signals, other than those required for understanding the invention, have not been shown. It is assumed that these signals, which have not been shown, are generated in each module according to requirements and with the correct phase.

This transmultiplexer receives two standardised PCM groups $PCM_1$ and $PCM_2$ each comprising 32 telephone channels, of which two are suppressed for synchronisation, sampled at 8000 Hz and coded from 8 bits. These 32 channels are thus multiplexed into frames lasting 1/8000 = 125 μs. The beginning of each frame is marked by the ascending edge of a synchronisation signal T which is common to the two PCM groups which are therefore synchronous. This signal T is a square signal at 8000 Hz supplied by the telephone hardware which deliver $PCM_1$ and $PCM_2$.

The demultiplexers $DX_1$ and $DX_2$ enable the signals which arrive in series at their inputs to be obtained in parallel at their outputs by known techniques. To this end, there are used, for example, registers which are successively loaded with the words of a PCM frame as they arrive and which are then simultaneously read in parallel when the frame is complete. The signal T synchronises this operation. Accordingly, the 60 samples of telephone signals $f_{t,k}$ ($k = 2, \ldots 61$) are obtained every 125 μs at the outputs of $DX_1$ and $DX_2$, the four synchronisation channels having been eliminated. The output registers of $DX_1$ and $DX_2$ enable these signals to be memorised during the arrival of the following frame.

The range of variation of $k$ is thus fixed for reasons which will be explained hereinafter.

In conventional systems, the real signal of each of the telephone channels is converted at this stage into an analytical signal. This necessitates the use of a calculation process involving a large number of successive samples of the same signal which in turn necessitates the use of extensive hardware.

In the transmultiplexer according to the invention, there is no need for compatibility with the signal of a secondary group, which enables a complex pseudo-analytical signal to be formed by the following simple calculation process:

Given two successives samples of one and the same channel $f_{t,k}$, $f_{t+T,k}$, the following two signals are initially formed:

$$a_{t,k} = \tfrac{1}{2}(f_{t,k} + f_{t+T,k})$$

$$b_{t,k} = \tfrac{1}{2}(f_{t,k} - f_{t+T,k})$$

The following conjugated complex signals, where $j = \sqrt{-1}$, are then formed from these two signals: $S_{t,m} = a_{t,k} + j b_{t,k}$ for $m = k = 2, \ldots, 61$; $S_{t,m}{}^x = a_{t,k} - j b_{t,k}$ for $m = 128 - k = 67, \ldots, 126$. Since this calculation is made for the samples $f_{t,k}$ and $f_{t+T,k}$, the following calculations will be made for the samples $f_{t+2T,k}$ anf $f_{t+3T,k}$, which corresponds to the band reduction by two obtained by passing from a real signal to an analytical signal. The amount of information contained in the two successives samples reappears in one of the two complex signals $S_{t,m}$ or $S_{t,m}{}^x$. The fact that these two conjugated complex signals are present corresponds to a need for calculation in the following components.

We shall term "unit interval" this time interval 2T = 250 μs during which the two successive samples $f_{t,k}$ and $f_{t+T,k}$ are processed. The square signal $T_1$ of frequency 4000 Hz, which enables this unit interval to be marked in the transmultiplexer, is obtained from T by division by 2 in the bistable circuit D.

These calculations are effected in the real-analytical converter TRA which is made up of 60 identical circuits enabling the 120 signals $S_m$ and $S_m{}^x$ to be obtained.

Figure 2:
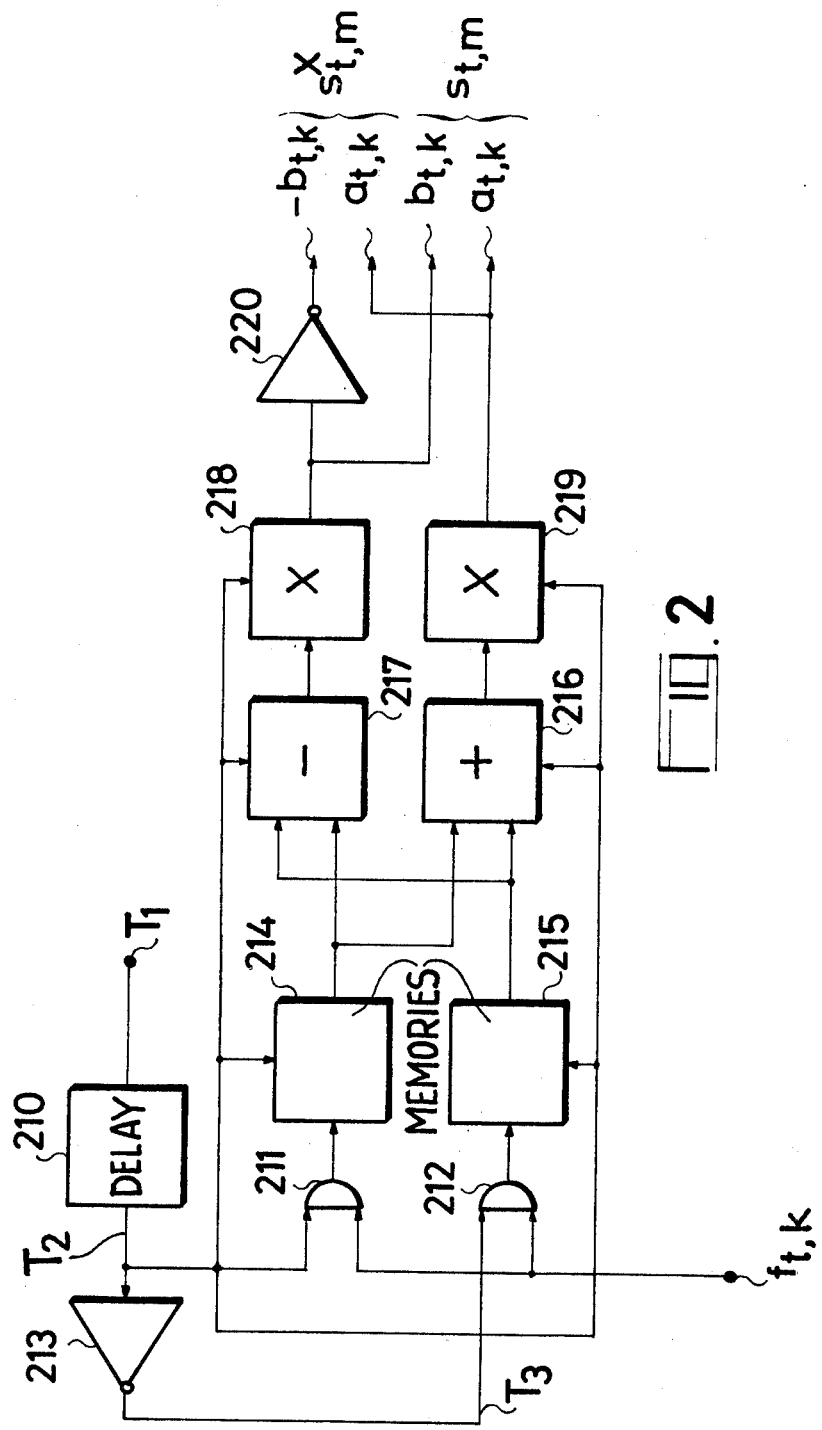
FIG. 2 illustrates one embodiment of the component TRA of the transmultiplexer illustrated in FIG. 1.

FIG. 2 diagrammatically illustrates one of these circuits comprising a delay circuit 210, two gates 211 and 212, two inverters 213 and 220, two memories 214 and 215, an adder 216, a substractor 217 and two multipliers 218 and 219. The connections represent the paths of the words or synchronisation signals without distinguishing whether the bits are in series or parallel.

The delay circuit 210 delivers from the signal $T_1$ a signal $T_2$ which is in phase with the signal $f_k$. This signal $T_2$ activates in particular the computation circuits 214 to 219 which comprise the necessary internal delays.

The gate 211 (an assembly of gates if the bits are in parallel) is open during the part corresponding to a state 1 of the signal $T_2$ (i.e. 125 μs) and accordingly allows through the signal $f_{t,k}$ which is stored in the memory 214.

The inverter 213 inverts the signal $T_2$ and applies the signal $T_3$ thus obtained to the gate 212 which is thus opened during the zero part corresponding to a state 0 of $T_2$ (i.e. the following 125 μs) and then allows through the signal $f_{t+T,k}$ which is stored in the memory 215.

The outputs of the memories 214 and 215 are applied to the adder 216 where the signal $2a_{t,k}$ is obtained and to the substractor 217 where the signal $2b_{t,k}$ is obtained.

The multipliers 218 and 219 are multipliers by 0.5 which enable $a_{t,k}$ and $b_{t,k}$ to be obtained.

The inverter 220 enables the signal $-b_{t,k}$ to be obtained from $b_{t,k}$.

Accordingly, two sets of signals $(a_{t,k}, b_{t,k})$ and $(a_{t,k}, -b_{t,k})$ are thus available at the output of the circuit shown in FIG. 2, representing the signals $S_{t,m}$ and $S_{t,m}{}^x$, because the complex notation is only a symbolic representation and since the digital systems are only able to effect the computations on the components of complex numbers.

For the purposes of computation in the Fourier transformer TFR, the 120 complex signals $S_{t,m}$ issuing from TRA have to be completed by 8 identically zero complex signals so that the 128 signals thus obtained may be written in the form of the column vector:

$$\begin{bmatrix} 0 \\ 0 \\ S_{t,2} \\ \cdot \\ \cdot \\ \cdot \\ S_{t,61} \\ 0 \\ 0 \\ 0 \\ 0 \\ 0 \\ S_{t,67} \\ \cdot \\ \cdot \\ \cdot \\ S_{t,126} \\ 0 \end{bmatrix} = \begin{bmatrix} 0 \\ 0 \\ a_{t,2} + j\, b_{t,2} \\ \cdot \\ \cdot \\ \cdot \\ a_{t,61} + j\, b_{t,61} \\ 0 \\ 0 \\ 0 \\ 0 \\ 0 \\ a_{t,61} - j\, b_{t,61} \\ \cdot \\ \cdot \\ \cdot \\ a_{t,2} - j\, b_{t,2} \\ 0 \end{bmatrix}$$

These 128 signals are processed in the Fourier transformer TFR which is a known apparatus which effects the matrix computation: $\vec{x_t} = [w]\vec{S_t}$. One example of embodiment of an apparatus such as this may be found in French Patent No. 69.45.634. [W] is a square matrix of which the elements $w_{n,k}$ have the value $[e(-j2/128)]^{n\cdot k} = w^{n \cdot k}$, $n$ and $k$ varying from 0 to 127.

We shall now show, with reference to a less complex example, that on the one hand the vector $x_t$ is real and that on the other hand this operation corresponds to the modulation of a series of carriers spaced at intervals of 4 kHz by the channel signals.

In the case of three channels + 1 identically zero channel (i.e. for a matrix 8 × 8), the above formula is written by replacing, as is customary in the expression of [W], the element $w^{n\cdot k}$ by its coefficient $n \cdot k$, taking into account that this coefficient is defined modulo 8 inclusive for negative values, and by deleting the index $t$ which is the same throughout.

$$\begin{bmatrix} x_0 \\ x_1 \\ x_2 \\ x_3 \\ x_4 \\ x_5 \\ x_6 \\ x_7 \end{bmatrix} = \begin{bmatrix} 0 & 0 & 0 & 0 & 0 & 0 & 0 & 0 \\ 0 & 1 & 2 & 3 & -4 & -3 & -2 & -1 \\ 0 & 2 & 4 & 6 & 0 & -6 & -4 & -2 \\ 0 & 3 & 6 & 1 & -4 & -1 & -6 & -3 \\ 0 & 4 & 0 & 4 & 0 & -4 & 0 & -4 \\ 0 & 5 & 2 & 7 & -4 & -7 & -6 & -5 \\ 0 & 6 & 4 & 2 & 0 & -2 & -4 & -6 \\ 0 & 7 & 6 & 5 & 4 & -5 & -6 & -7 \end{bmatrix} \cdot \begin{bmatrix} 0 \\ a_1 + j\, b_1 \\ a_2 + j\, b_2 \\ a_3 + j\, b_3 \\ 0 \\ a_3 - j\, b_3 \\ a_2 - j\, b_2 \\ a_1 - j\, b_1 \end{bmatrix}$$

By forming, in accordance with the rules of matrix computation, the product of the lines of the matrix by the vector S, it is found that only terms of the form $[w^k(a+jb) + w^{-k}(a-jb)]$ are obtained. Now, $w^k$ and $w^{-k}$ are of the form $(c+jd)$ and $(c-jd)$ and, by developing the above expression, a term of the form $2(ac-db)$, where the imaginary terms have disappeared, is obtained.

This result emanates from the particular expression given to the vector $\vec{S}$ and, more particularly, from the introduction of the zero channel corresponding to the indices $m=0$ and $m=64$, and from the symmetrical distribution about this index 64 of the terms $S_m$ and $S_m{}^x$. We shall term a vector such as this an anti-symmetrical vector. It is pointed out that it implies that the matric is square with an even number of lines and hence columns = 2N.

Assuming now that only the channel 1 is not zero, the vector $\vec{x_t}$ is thus given by:

$$x_t = \begin{bmatrix} x_0 \\ x_1 \\ x_2 \\ x_3 \\ x_4 \\ x_5 \\ x_6 \\ x_7 \end{bmatrix} = \begin{bmatrix} w^0(a_1 + j\, b_1) + w^0(a_1 - j\, b_1) \\ w^1(a_1 + j\, b_1) + w^{-1}(a_1 - j\, b_1) \\ w^2(a_1 + j\, b_1) + w^{-2}(a_1 - j\, b_1) \\ w^3(a_1 + j\, I) + w^{-3}(a_1 - j\, b_1) \\ w^4(a_1 + j\, b_1) + w^{-4}(w^{\,7} - j\, b_1) \\ w^5(a_1 + j\, b_1) + w^{-5}(a_1 - j\, b_1) \\ w^6(a_1 + j\, b_1) + w^{-6}(a_1 - j\, b_1) \\ w^7(a_1 + j\, b_1) + w^{-7}(a_1 - j\, b_1) \end{bmatrix}$$

$$= \begin{bmatrix} w^0 \\ w^1 \\ w^2 \\ w^3 \\ w^4 \\ w^5 \\ w^6 \\ w^7 \end{bmatrix} \cdot (a_1 + j\, b_1) + \begin{bmatrix} w^0 \\ w^{-1} \\ w^{-2} \\ w^{-3} \\ w^{-4} \\ w^{-5} \\ w^{-6} \\ w^{-7} \end{bmatrix} \cdot (a_1 - j\, b_1)$$

$$= \vec{w_{1,t}} \times (a_1 + j\, b_1)_t + (\vec{w_{1,t}})^{-1} \times (a_1 - j\, b_1)_t$$

Since this operation takes place in 250 μs, it can be seen that the terms of $\vec{w_{1,t}}$ may be considered as the 8 successive analytical samples of one period of a sinusoidal signal of frequency $1/250.10^{-6} = 4000$ Hz. In the case of the matrix 128 × 128, there will be 128 successive samples of the same period.

These samples are multiplied by the analytical sample $(a_1 + j\, b_1)_t$ of a voice signal of which the frequency is comprised within the telephone baseband of 300 to 3400 Hz. As already known, this multiplication operation is the translation in digital form of a modulation operation in analog form. As has already been seen, the operation $(\vec{w_{1,t}})^{-1} \times (a_1 - j\, b_1)_t$ enables a real signal to be obtained by adding these two terms. Accordingly, the terms of $\vec{x_t}$ are the 8 successives real samples of one period of a sinusoidal signal of frequency 4000 Hz modulated by a voice signal, this modulated signal thus being sampled 8 × 4000 = 32,000 times per second.

In order to see the type of modulation obtained, it is sufficient to point out that $\vec{w_{1,t}}$ and $(a+j\, b_1)_t$ both correspond to vectors rotating in the direct sense and that $(\vec{w_{1,t}})^{-1}$ and $(a_1 - j\, b_1)$ both correspond to vectors rotating in the opposite sense. In the two cases, the rotational speeds are added together in the case of products which thus correspond to terms of higher frequency than the carrier. Accordingly, the modulation in question is an upper sideband modulation. However, regularly repeated lobes are obtained on account of the modulation emanating from the sampling operation. The method of modulation in question is in fact a conversion of Hartley's modulation method.

By applying the same reasoning to channel 2 alone, the following result is obtained:

$$x_t = (w_{1,t})^2 \times (a_2 + j\, b_2)_t + (w_{1,t})^{-2} \times (a_2 - j\, b_2)_t$$

where the terms of $(w_{1,i})^2$ may be considered as the 8 successive analytical samples of two periods of a sinusoidal signal of which the frequency is thus 8000 Hz. Accordingly, the terms of $x_i$ are the 8 successive real samples of two periods of a sinusoidal signal of frequency 8000 Hz which has been subjected to upper single sideband modulation by a voice signal and which is sampled 32,000 times per second.

This reasoning is general and may be applied by degrees.

When the three channels are active, the terms of $x_i$ may be considered as the 8 successive samples of a signal comprising the superposition of three carriers spaced at intervals of 4000 Hz and modulated by upper sideband modulation.

It is pointed out that the spacing between the carriers is fixed by the sampling frequency of the voice signals because the unit interval is fixed by this frequency and corresponds to a whole number of periods of carriers for each channel, this number being increased by one between each channel. The sampling frequency of these carriers is fixed by the size of the matrix [w] in dependance upon the unit interval.

The result (modulation) thus obtained, however, is only an approximation for the following three reasons:

on the one hand, the sampling process required for the digital processing gives rise to the well-known advent of modulation lobes, i.e. upper intermodulation products, which in turn gives rise both to interchannel crosstalk, due to the sampling of the voice signals at 8000 Hz, and to the repetition of the spectrum of the total signal in accordance with the multiples of the sampling frequency of the carriers;

on the other hand, the sample of the voice signal is fixed and is therefore constant throughout the duration of the successive samples of the carrier taken in the single interval, whereas it should normally develop and have a different value for each sample of the carrier. Although Shannon's condition is thus satisfied, the spectrum is distorted in this way;

finally, the signal $a + jb$ used is only a first order approximation of an analytical signal, with the result that the lower sideband is not completely suppressed during the modulation operation, whence another source of crosstalk.

It is for these reasons in particular that the signal finally obtained is not identical with that of a secondary group.

Reverting to the transmultiplexer described above, it can be seen that, apart from the channel 0 which is taken as zero to obtain a vector $S_t$ of adequate constitution, the three zero channels 1, 62 and 63 were also used. This means that the passage through TFR corresponds to the modulation of 60 carriers staggered at intervals of 4 kHz from 8 kHz to 244 kHz by 60 voice channels numbered from 2 to 61. There are two reasons for inserting the three zero channels 1, 62 and 63:

on the one hand to obtain a number of channels equal to a power of 2, which is the case because $128 = 2^7$. This enables the so-called Fast Fourier Transform methods of computation, which are particularly advantageous, to be used in TFR;

on the other hand to obtain the equivalent of the clearance channels by analog techniques which enables the subsequent filtration problems to be simplified.

Accordingly, 128 digital samples of a real signal sampled at a frequency of $128 \times (1/250 \cdot 10^{-6}) = 512,000$ times per second are simultaneously obtained every 250 μs at the output of the Fourier transformer TFR.

Figure 3:
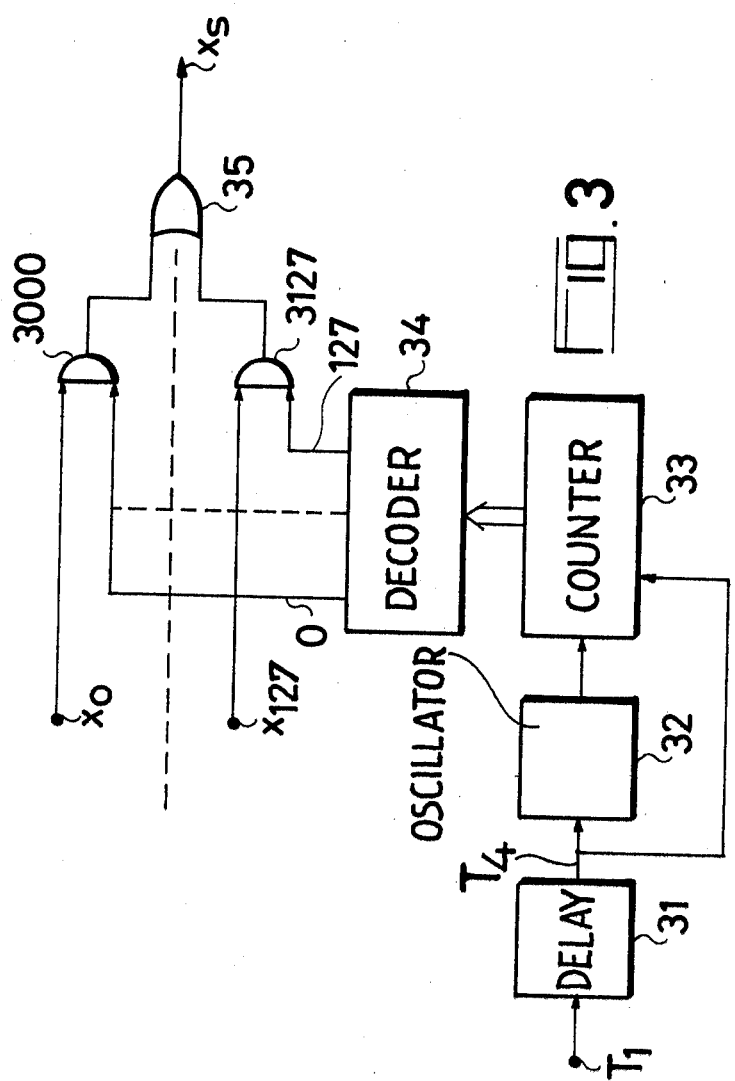
FIG. 3 illustrates one embodiment of the component PS of the transmultiplexer illustrated in FIG. 2.

The serializer PS enables these samples to be brought back into series in the unit interval of 250 μs. FIG. 3 diagrammatically illustrates one embodiment of this serializer comprising a delay circuit 31, an oscillator 32, a counter 33, a decoder 34, AND gates 3000 to 3127 and an OR gate 35.

The signal $T_1$ is delayed in the delay circuit 31 so as to compensate (modulo 250 μs) the delays due to the computations in TRA and TFR. The signal $T_4$ thus compensated in phase synchronises the oscillator 32 which supplies a signal at 512,000 Hz. This signal at 512,000 Hz causes the counter 33 to rotate. The phase of this counter is maintained by the signal $T_4$ which resets it to zero so that the backward count always begins with the state 0 at the beginning of the unit interval. The counter 33 counts by 128 and its counts are decoded by the decoder 34 which has 128 outputs 0 to 127. These outputs are connected to the 128 AND-gates 3000 to 3127 which are thus opened one after the other during the unit interval of 250 μs. These gates receive the signals $x_0$ to $x_{127}$ coming from TFR of which the output registers memorize the 128 real words of a unit interval for the duration of the following unit interval. The OR-circuit collects the outputs of the AND gates and thus delivers the serial digital signal $x_s$ composed of the serialized signals $x_0$ to $x_{127}$.

It is known that the Fast Fourier Transform algorithms ultimately give an output vector of which the components form a permutation of the natural order. It is of advantage to bring these components back into the natural order by an adequate mixing of the connections between the outputs of TFR and the inputs of PS. In the absence of this mixing, however, the signal would be completely incompatible in the sense that the modulation, which would remain grouped except for crosstalk about the carriers of the normalised frequency plane, would be completely distributed in the bandwidth. In other words, crosstalk would be complete. Although this is not troublesome, it would be absolutely essential to use a strictly homologous apparatus at the receiving end.

The signal $x_s$ enters the commutator TS of which the function will be explained hereinafter.

The output of the commutator TS is applied to the digital-analog converter DA which converts the digital signal $x_s$ into an analog signal of which the spectrum extends from 0 to 256 kHz and, in addition, is repeated every 215 kHz on account of the sampling. In fact, the energy is low between 0 and 8 kHz and between 248 and 256 kHz because it only corresponds to the crosstalk, as seen earlier on, the channels 0, 1, 62 and 63 being zero. Since it is desired to obtain a signal of which the bandwidth is that of a secondary group, i.e. 240 kHz, the frequencies of the signal issuing from the converter DA are limited by adequately calculating the output filter thereof in such a way that is only allows through the 8-248 kHz band. This facilities the work of the subsequent components, although it may also be carried out in them. An analog signal, named base-band is thus obtained.

In order to obtain the desired frequency signal, it is now necessary to convert this base-band signal. This conversion is carried out in the modulator BLU which is an ordinary single sideband modulator and by which it is possible, for example by subjecting a carrier at 304 kHz to upper single sideband modulation, to obtain a signal having a spectrum comprised between 312 and 552 L kHz, i.e. occupying as required the bandwidth of a secondary group.

The digital processing at the receiving end imposes a condition of frame synchronisation and a condition of level equality between the transmitter and the receiver.

To this end, a constant signal REF is inserted at regular intervals into the signal $x_s$ applied to the converter DA during one complete unit interval. This signal acts as phase reference and level reference for the receiver. For example, this signal may be inserted every 8 seconds, in which case it is quite inaudible. It would also be possible to transmit two signals, one acting as phase reference and the other as level reference.

The commutator TS shown diagrammatically in FIG. 1, but produced for example with transistors, enables the input of the converter DA to be connected either to the output of the serializer PS or to a line to which the signal REF is permanently applied. This signal has a constant level, for example half of the scale of the converter DA.

This commutator is activated by a signal coming from the counter SY which counts the signals $T_1$ backwards, for example by 32,000, which gives a control signal every 8 seconds. SY contains an internal delay circuit enabling the operational interval of TS to be made to coincide with one complete unit interval.

Figure 4:
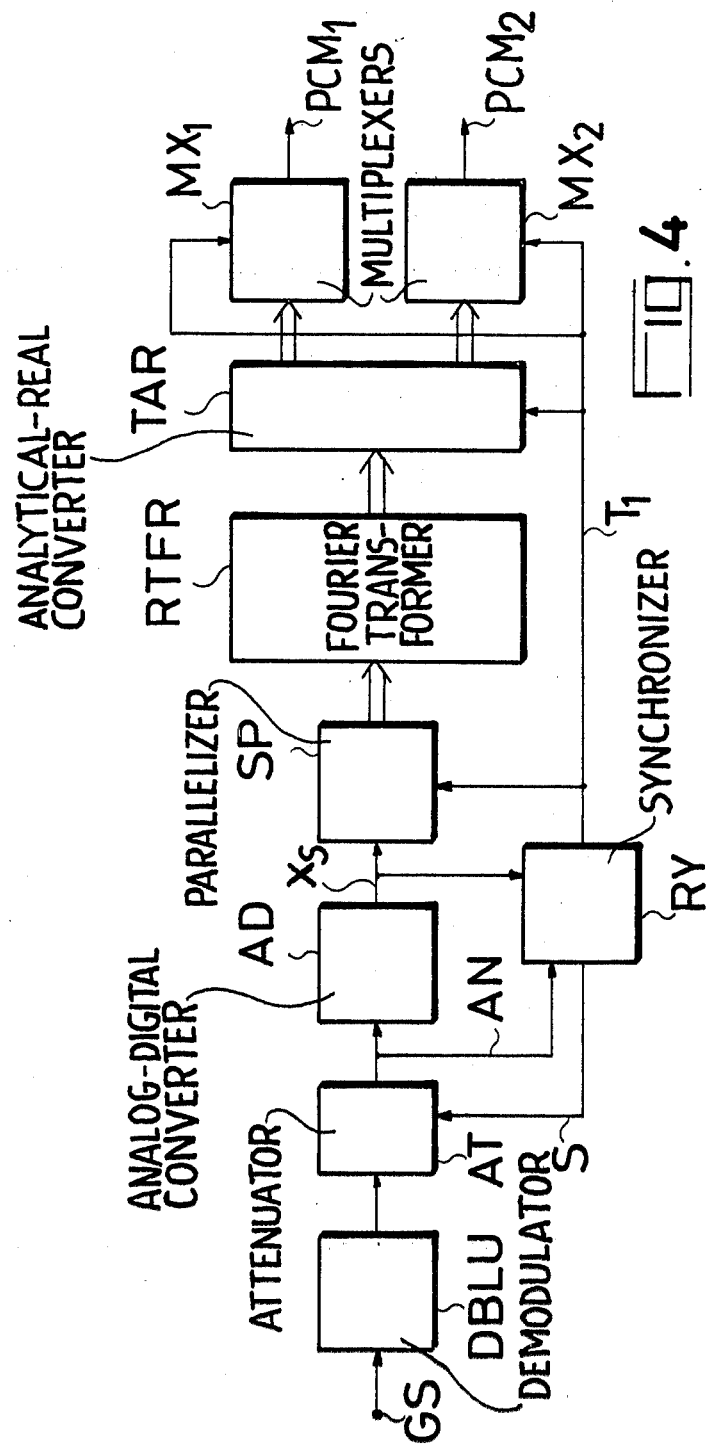
FIG. 4 illustrates a receiving transmultiplexer.

The receiving transmultiplexer shown in FIG. 4, comprises a demodulator DBLU, an attenuator AT, an analog-digital converter AD, a synchronizer RY, a parallelizer SP, a Fourier transformer RTFR, an analog-real converter TAR and two multiplexers $MX_1$ and $MX_2$. The following description is made in accordance with the same conventions as those used by the transmitting transmultiplexer.

This receiving transmultiplexer receives an analog frequency signal GS transmitted by a transmitter homologous with the receiver. This signal thus occupies the 312-552 kHz frequency band.

The demodulator DBLU, which is an ordinary single sideband demodulator, enables this signal to be converted in the 8-248 kHz band. It therefore delivers an analog signal which shall be termed base-band signal.

This band-band signal is attenuated in the attenuator AT of which the function will be described hereinafter and which delivers an attenuated signal AN.

This signal AN is applied to the analog-digital converter AD. The analog-digital converter functions at a frequency of 512,000 times per seconds and supplies 128 digitalized samples of the signal AN in series every 250 $\mu$s. This serial digital signal $x_s$ is thus the same as that of the same name in the transmitter.

In order to ensure this equality of level and to maintain synchronisation, the signal $x_s$ and the signal AN are both applied to the synchronizer RY. The synchronizer RY analyses the constant level signal present for 250 $\mu$s every 8 s and delivers a correcting signal S which controls the attenuator AT so as to obtain a correct level of the signal $x_s$ and a synchronization signal $T_1$ homologous with that of the same name in the transmitter.

Figure 5:
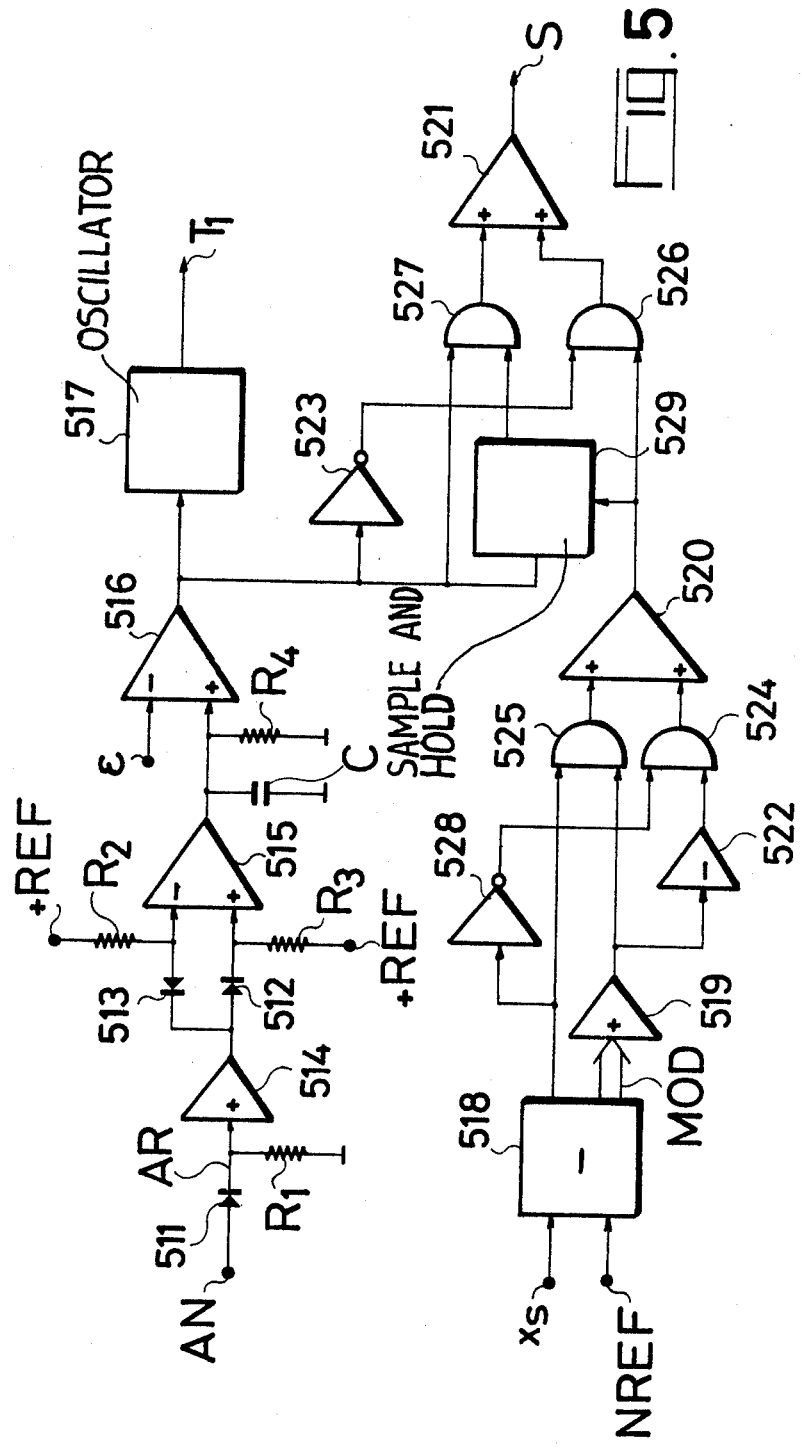
FIG. 5 illustrates one embodiment of the component RY of the transmultiplexer illustrated in FIG. 4.

FIG. 5 shows one embodiment of the synchronizer RY comprising three diodes 511, 512 and 513, four resistors $R_1$ to $R_4$, a capacitor C, an amplifier 514, an analog subtractor 515, a comparator 516, an oscillator 517, a digital subtractor 518, three analog summators 519, 520 and 521, one analog inverter 522, two digital inverters 423 and 528, four analog gates 524 to 527 and a sample-and-hold circuit 529.

The signal AN is rectified by the diode 511 and the resistor $R_1$. A strictly positive signal AR is thus obtained. The amplifier 514 acts as a separator for applying this signal AR to the diodes 512 and 513. The diodes are connected head-to-tail and are biased by a constant voltage +REF across the resistors $R_2$ and $R_3$. The value of +REF is substantially equal to the normal positive value of the reference signal contained in the signal AN. The diode 512 only allows values of AR above +REF through whilst the diode 513 allows only values of AR below +REF through. The signal at the anode of the diode 513 is thus subtracted from the signal at the cathode of the diode 512 in the subtractor 515. In short, this is equivalent to full-wave rectifying the signal AR about the value of +REF. The common mode at the inputs of the subtractor 515 disappears in this operation and the signal at the output of the subtractor is thus permanently positive except for the duration of the reference signal where it is zero and during the transient passages of AN through the value +REF. This signal charges a circuit made of the resistor $R_4$ and the capacitor C. The time constant of this circuit is below the duration of the reference signal so that when this reference signal is present in the signal AN, the circuit $R_4$-C has time to discharge to zero. However, this time constant is sufficient for the circuit $R_4$-L not to discharge during the transient passages of the signal AN through the value +REF.

The comparator circuit 516 compares the voltage present in the circuit $R_4$-C with a value which, although very low, is sufficient to allow fairly switching of the circuit 516 when the circuit $R_4$-C is discharged. Under these conditions, the circuit 516 switches after the beginning of the reference signal and its output passes from a logic state 1 to a logic state 0. When the reference signal disppears, the voltage present in the circuit $R_4$-C increases again almost instantaneous on account of the low output impedance of the subtractor 515 and the circuit 516 itself also reswitches on the field. The ascending edge of the output signal of the circuit 516 thus clearly marks the end of the reference signal and hence the beginning of the following unit interval.

This signal, coming from the comparator 516, enables the oscillator 517 to be synchronized. The oscillator 517 supplies the signal $T_1$ which is, for example, a square signal at 8000 Hz of which the transitions in the same direction thus have a period of 250 $\mu$s.

It is difficult to obtain adequate level precision in particular on account of the threshold of the diodes, to control the attenuator AT by this part of the circuit SY. In addition, the converter AD would be removed from the components subjected to the control.

Accordingly, the value of the digital signal $x_s$ is compared with the normal value of the reference signal by subtracting from it this value NREF in the digital subtractor 518. The result of this operation is expressed in the form of a digital word comprising in parallel a sign bit SIG and bit MOD representing the absolute value of the deviation.

The voltages representing the bits of the signal MOD are then added together in the analog summator 519. A non-linearity is thus introduced although it does not affect the result because the system is pilot-controlled. The result of this sum is always positive and the analog inverter 522 is used to make the negative value available as well. The choice between this positive value and this negative value is made by the sign bit SIG which, according to circumstances, opens one of the analog gates 524 and 525 either directly or by way of a signal obtained by inversion of SIG in the digital inverter 528. The outputs of these gates are collected by the analog summator 520 which thus delivers a positive or negative error voltage according to the direction of the deviation between $x_s$ and NREF.

The value of this voltage is only correct during the instants where the reference signal is present in $x_s$. These instants are identified by a state 0 at the output of the comparator 516. The digital inverter 523 enables an opening signal for the analog gate 526 to be obtained from this zero voltage. The summator 521 then receives the error voltage and delivers the signal S which controls the attenuator AT.

The response of this looped system is fairly rapid so that, at the end of the reference signal, it is in equilibrium, $x_s$ being equal to NREF except for one bit. It is thus possible to obtain the required precision because, in accordance with standard practive, the converter AD is coded with more bits than necessary so as to avoid the errors of truncation in the following apparatus.

When the state of the output of the circuit 516 changes at the end of the reference signal, this change of state controls the sample-and-hold circuit 529 which memorizes the error voltage and applies it to the analog gate 527 for the eigh seconds preceding the following reference signal. This gate is opened by the state 1 which is then present at the output of the circuit 516, whilst the gate 526 is closed by the state 0 present at the output of the inverter 523. The error signal thus memorized is then applied to the summator 521 which thus still delivers the same signal S as at the end of the reference signal.

Figure 6:
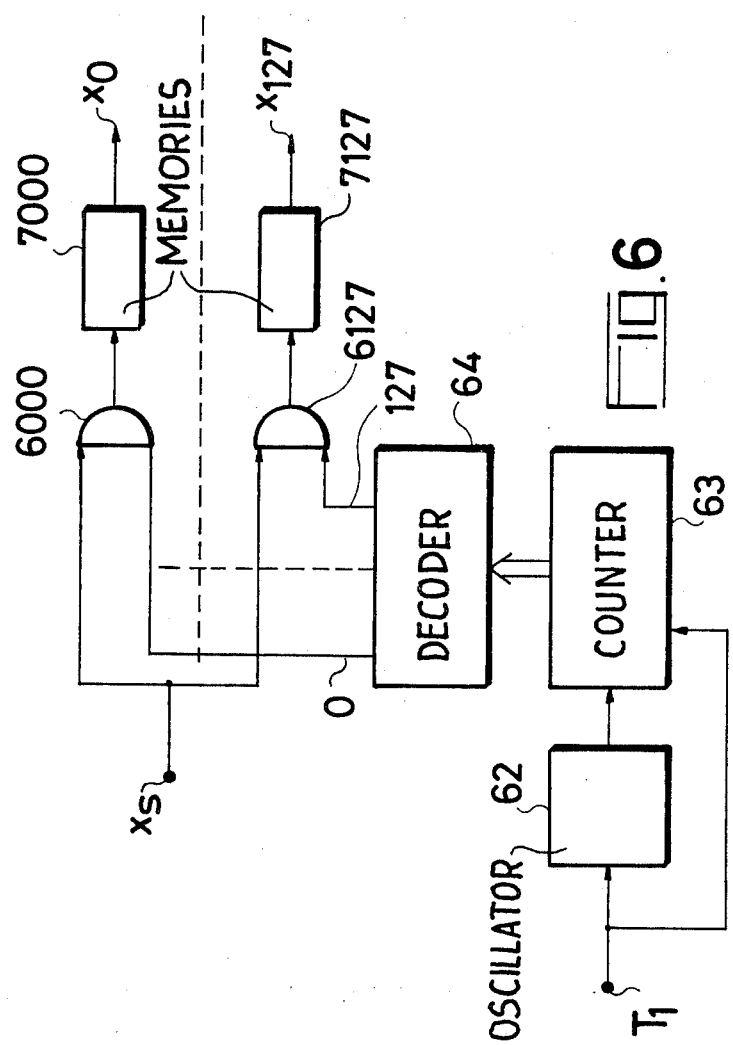
FIG. 6 illustrates one embodiment of the component SP of the transmultiplexer illustrated in FIG. 4.

The paralleliser SP thus receives in series 128 digitalised samples in 250 μs and presents these 128 samples in parallel to the Fourier transformer RTFR every 250 μs. FIG. 6 diagrammatically illustrates one embodiment of this paralleliser which comprises an oscillator 62, a counter 63, a decoder 64, gates 6000 to 6127 and memories 7000 to 7127.

The signal $T_1$ synchronises the oscillator 62 which delivers a signal at 512,000 Hz. This signal at 512,000 Hz causes the counter 63 to rotate. The phase of this counter is maintained by the signal $T_1$ which resets it to zero so that the backward count always begins with the state 0 at the beginning of the unit interval. The counter 63 counts by 128 and its states are decoded by the decoder 64 which comprises 128 outputs 0 to 127. These outputs are connected to the 128 AND gates 6000 to 6127 which are thus opened one after the other during the unit interval of 250 μs. These gates all receive the same signal $x_s$ coming from the converter AD. Accordingly, they successively allow through the samples $x_0$ to $x_{127}$. These samples are memorized in the memories 7000 to 7127. At the beginning of each unit interval, therefore, these memories contain the 128 samples of the preceding unit interval. These 128 samples $x_{t,m}$ thus form a column vector $x_t$ of which the elements are $x_{t,0}$ to $x_{t,127}$. By virtue of the decoder 64, it is possible in particular to carry out mixing opposite to that used at the transmitting end in the case where this variant is used.

At the beginning of each unit interval, this column vector is transferred to the Fourier transformer RTFR, i.e. at the beginning of each unit interval the contents of the 128 output memories of SP are transferred to the 128 input registers of RTFR.

This transformer is identical with the transformer TFR of the transmitter except for the fact that the values of the coefficients W which it contains are those which make it possible to effect the opposite transformation to that carried out at the transmitting end and thus corresponding to the operation $S_t = [w]^{-1} \cdot x_t$.

Accordingly, RTFR delivers 128 complex signals $S_t$, m every 250 μs such that $$S_{t,m} = C_{t,k} + j d_{t,k} \text{ for } m = 2, \ldots, 61$$

$$S_{t,m}{}^x = e_{t,k} - j g_{t,k} \text{ for } m = 128-k = 67, \ldots, 126$$

In principle, the signals corresponding to $k = 0, 1, 62, 63$ should be zero such that $C_{t,k} = e_{t,k}$ and $d_{t,k} = g_{t,k}$.

In practice, this is not the case due in particular to the truncation of the spectrum at the transmitting end of the quantification signal in the analog-digital conversion and roundingoff errors in RTFR.

Accordingly, the signals corresponding to $k = 0, 1, 62, 63$, which represent the zero channels added at the transmitting end to form the vector $\vec{S}_p$ are not used.

A mean value is formed from the imaginary parts of $S_{t,m}$ and $S_{t,m}{}^x$ and from the real parts of these signals, which gives:

$$a_{t,k} = \tfrac{1}{2} (C_{t,k} + e_{t,k})$$

$$b_{t,k} = \tfrac{1}{2} (d_{t,k} - g_{t,k})$$

The initial PCM samples are thus obtained by making the following calculations:

$$f_{t,k} = a_{t,k} + b_{t,k}$$

$$f_{t+T,k} = a_{t,k} - b_{t,k}$$

These calculations are made in the analytical-real converter TAR which is made up of 60 identical circuits enabling the 60 signals of the 60 non-zero PCM channels transmitted to be obtained.

Figure 7:
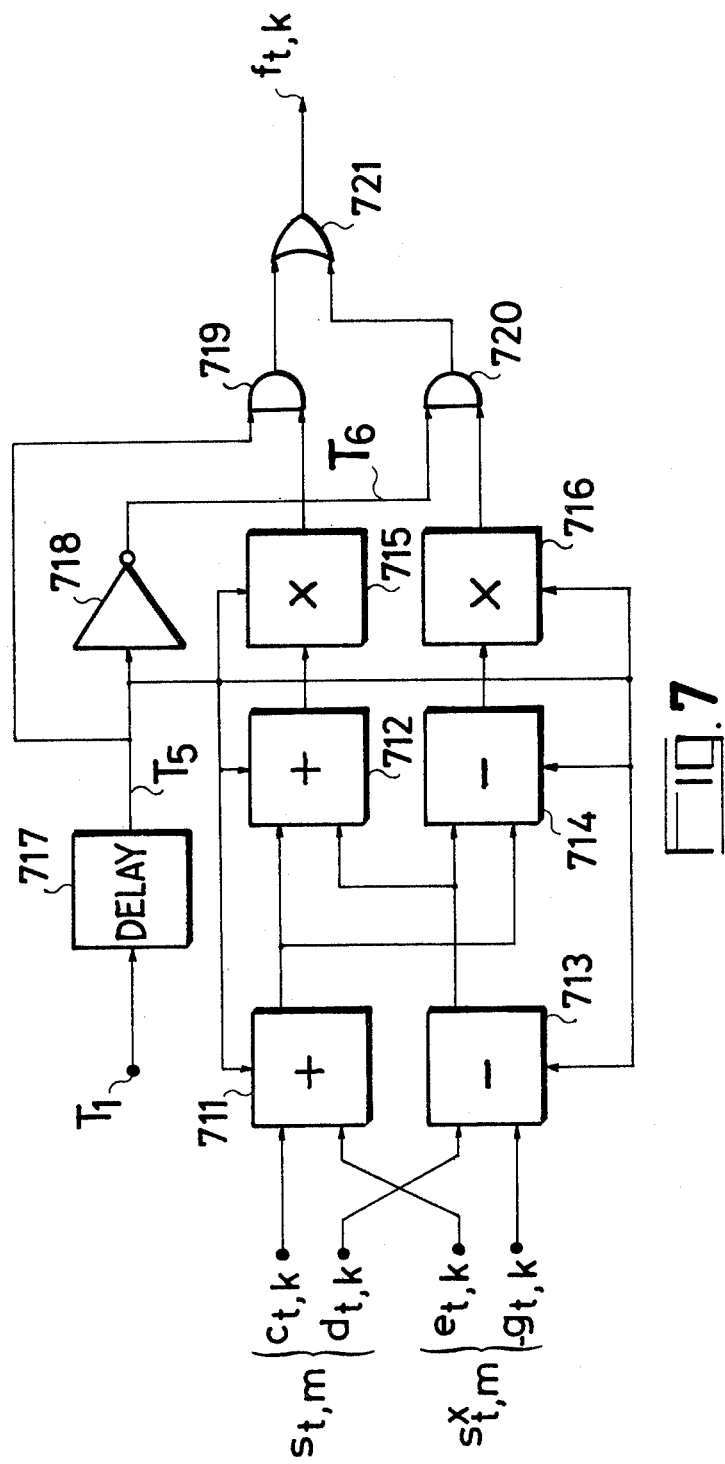
FIG. 7 illustrates one embodiment of the component TAR of the multiplexer illustrated in FIG. 4.

FIG. 7 diagrammatically illustrates one of these circuits which comprises two adders 711 and 712, two subtractors 713 713 and 714, two multipliers 715 and 716, one delay circuit 717, an inverter 718, two AND gates 719 and 720 and an OR gate 721. The connections represent the path of the words or synchronisation signals without distinguising whether the bits are in series or parallel.

This circuit receives at its input the binary words representing the real parts and imaginary parts of the words $S_{t,m}$ and $S_{t,m}{}^x$ coming from RTFR. It also receives the synchronisation signal $T_1$ which is a square signal with a period of 250 μs composed of a positive part with a duration of 125 μs corresponding to a logic state 1, followed by a zero part with a duration of 125 μs corresponding to a logic state 0.

The delay circuit 717 delivers from the signal $T_1$ a signal $T_5$ which is in phase with the signals $S_{t,m}$. This signal $T_5$ activates in particular the calculation circuits 711 to 716 which comprise the internal delays required for their successive operation.

The adder 711 effects the operation $C_{t,k} + e_{t,k}$ whilst the subtractor 713 effects the operation $d_{t,k} - (-g_{t,k})$.

The adder 712 effects the operation $(C_{t,k} + e_{t,k}) + (d_{t,k} + g_{t,k})$ whilst the subtractor 714 effects the operation $(C_{t,k} + e_{t,k}) - (d_{t,k} + g_{t,k})$.

The multiplier 715 effects the operation $[(C_{t,k} e_{t,k}) + (d_{t,k} + g_{t,k})] \times 0.5$, whilst the multiplier 716 effects the operation $[(C_{t,k} + e_{t,k}) - (d_{t,k} + g_{t,k})] \times 0.5$.

Accordingly, two successive words $f_{t,k}$ and $f_{t+T,k}$ of the PCM channel no.$k$ are available at the output registers of the multipliers 715 and 716. These registers are designed to retain these words, whilst presenting them to the output connections, until the following operation.

The gate 719 (as assembly of gate if the bits are in parallel) is opened during the positive part of the signal $T_5$ (i.e. 125 $\mu$s) and therefore allows the word $f_{t,k}$ through during the first half of the unit interval 2T.

The inverter 718 inverts the signal $T_5$ and applies the signal $T_6$ thus obtained to the gate 720 which is thus open during the zero part of the signal $T_5$ (i.e. the following 125 $\mu$s) and thus allows the word $f_{t+T,k}$ through during the second half of the unit interval 2T.

The OR gate 721 collects the output of the AND gates 719 and 720 and thus delivers the successive words $f_{t,k}$ of the PCM channel no. $k$.

Of the 60 outputs of the converter TRA, 30 are connected to the multiplexer MX1 and the other 30 to the multiplexer MX2. These multiplexers are synchronised by the signal $T_1$ and enable the two frames $PCM_1$ and $PCM_2$, identical with those applied to the transmitter, to be reconstituted by known techniques.

One interesting variant of these apparatus consists in replacing, in the transmitter, the multiplexers $DX_1$ and $DX_2$ by 60 analog-digital converters serving 60 ordinary telephone channels and in replacing, in the receiver, the multiplexers $MX_1$ and $MX_2$ by 60 digital-analog converters serving 60 ordinary telephone channels.

Digital apparatus capable of performing the function of secondary group modulators and demodulators are obtained in this way. However, the analog signal used is not compatible with the ordinary apparatus, but is able to use the same transmission channels. However, this analog signal will be compatible if the analog-digital converters and digital-analog converters used apply the coding law standardised in telephone engineering with that used in the transmultiplexers described above. It is thus possible to construct transmission systems by which it is possible for example to connect a conventional exchange with spatial switching of analog signals to an electronic standard with time-division switching of PCM signals. To this end, a transmitter according to the above variant and a receiving transmultiplexer such as described are used in the direction conventional exchange → electronic exchange, whereas a transmitting transmultiplexer such as described above and a receiver corresponding to the above variant are used in the opposite direction.

FIG. 8a is a block diagram of a link such as described above between a transmitting transmultiplexer ETMX and a receiving transmultiplexer RTMX, in which two groups $PCM_1$ and $PCM_2$ are transmitted from one secondary group GS.

As shown in FIG. 8b, the roles of the transmitter and the receiver may readily be reversed. In this case, the transmultiplexer RTMX will receive a secondary group GS, compatible or not, and will transmit two groups $PCM_1$ and $PCM_2$ in line. If the secondary group GS is compatible, i.e. if it emanates from standard telephone hardware, which is possible because in the apparatus described the band width is the same and only the meaning of the signals differ, the PCM channels transmitted will not be compatible, i.e. although the signals conform to the PCM standards their meaning will be incoherent for a normal PCM decoder of account of crosstalk arising out of the same reasons as those for which the group GS is not compatible. The transmultiplexer ETMX receiving the groups $PCM_1$ and $PCM_2$ will transmit a secondary group GS identical with the initial secondary group except for the quantification noise introduced by the analog-digital conversion.

The following documents have been quoted during the French prosecution:

Journal FR "Cables et transmissions" volume 28, no. 4 Octobre 1974, article "Maquette de faisabilité d'un transmultiplexeur numérique" by Roche et al.

French patent No. FR 2,188,920 (T.R.T.).

What we claim is:

1. An apparatus for multiplexing a set of $n$ incoming signals arriving respectively on $n$ input telephone channels into an output frequency division multiplex signal going out on an output channel, said apparatus comprising:

means for processing said incoming signals, providing every T $\mu$s $n$ complex signals $S_p$, $m = \frac{1}{2} [(f_p, k+f_t+T, k) + j (F_p, k - f_p, k - f_t + T, k)]$ and $n$ conjugate complex signals $S_t^*$, $m = \frac{1}{2} [(f_p, k + f_t + T, k) - j (f_p, k - f_t + T, k)]$, and delivering said signals $S_p$, $m$ and $S_t^*$, $m$;

means for receiving said signals $S_p$, $m$ and $S_t^*$, $m$, ditigally computing every 2T $\mu$s the Fourier Transform of order 2N × 2N (N < $n$) of said signals $S_p m$ and $S_t^*$, $m$, and delivering the result of said computation as 2N real signals in parallel;

means for serializing according to a given order and during an interval of 2T $\mu$s said real signals, delivering a serial digital signal; and means for converting said serial digital signal into said output division frequency multiplex signal.

2. An apparatus as claimed in claim 1, further comprising means for periodically inserting in said serial digital signal a synchronisation signal with a calibrated level, a calibrated duration, and a fixed position in said serial digital signal.

3. An apparatus as claimed in claim 1, wherein said means for computing the Fourier Transform are designed for using a Fast Fourier Transform process, and said given order is a restored natural order; whereby cross-talk in said output channel is minimized.

4. An apparatus as claimed in claim 1, wherein said set of $n$ incoming signals includes at least a sub-set of signals grouped in a PCM frame, said means for providing the signals $f_p$ $k$ comprise at least a PCM demultiplexer.

5. An apparatus as claimed in claim 1, wherein said converting means comprise:

a digital-analog converter for converting said serial digital signal into a base-band signal; and a signal side-band modulator for modulating said base-band signal and delivering said output signal.

6. An apparatus as claimed in claim 1, wherein, said incoming telephone channels being distinct analog channels, said means for providing the signals $f_{t,k}$ comprise at least one analog-digital converter.

7. An apparatus for demultiplexing an incoming frequency division multiplex signal arriving on an input channel into a set of $n$ output signals going out respectively on $n$ output telephone channels, said apparatus comprising:

means for converting said incoming frequency division multiplex signal into a serial digital signal; said serial digital signal comprising 2N real signal during 2 T $\mu$s;

means for parallelizing according to a given order said serial digital signal, delivering said 2N real signals in parallel every 2T μs;

means for receiving said 2 N real signals, digitally computing every 2T μs the Inverse Fourier Transform of order 2N × 2N (N > n) of said 2N real signal in parallel, and delivering n complex signals $S_p\ n + C_p\ k + jd_p\ k$ and n conjugate complex signals $S_t^*,\ n = et,\ k - jg_p k$; and means for receiving said signals $S_p\ n$ and $S_t^*,\ n$, digitally computing every 2T μs n signals $f_p\ k = \frac{1}{2}[(ct, k + et,k) + (d_p\ k = g_p\ k)]$ and n signals $f_t + T, k = \frac{1}{2}[(Ct, k = e\ t,k) = (d_p k + g_p\ k)]$, and delivering successively said n signals $f_p\ k$ in parallel and then said n signal $f_t + T, k$ in parallel; and means for distributing said signals $f_p k$ and $f_t + T, k$, onto said output telephone channels.

8. An apparatus as claimed in claim 7, wherein said incoming frequency division multiplex signal includes a synchronisation signal of calibrated level and of calibrated duration inserted periodically at a fixed time position; and further comprising regulating means incorporated into said converting means for correcting the level of said incoming frequency division multiplex signal; and means for analysing said calibrated level and said fixed time position, delivering a control signal to said regulating means and a timing signal for synchronizing said apparatus.

9. An apparatus as claimed in claim 7, wherein said means for computing the Inverse Fourier Transform are designed for using a Fast Fourier Transform process, and said given order is a scrambled order used in said Fast Fourier Transform process.

10. An apparatus as claimed in claim 7, wherein said set of n output signals includes at least a sub-set of signals grouped in a PCM frame said distributing means comprise at least a PCM multiplexer.

11. An apparatus as claimed in claim 7, wherein said converting means comprise:

a single-side-band demodulator for demodulating said incoming frequency multiplex signal, delivering a baseband signal; and an analog-digital converter for converting said baseband signal, providing said serial digital signal.

12. An apparatus as claimed in claim 7, wherein said output telephone channels being distinct analog channels, said output means comprise at least one digital-analog converter.

* * * * *